(12) United States Patent
Mallette et al.

(10) Patent No.: US 11,305,885 B2
(45) Date of Patent: Apr. 19, 2022

(54) AUXILIARY POWER UNIT ADAPTIVE COOLDOWN CYCLE SYSTEM AND METHOD

(71) Applicant: HONEYWELL INTERNATIONAL INC., Morris Plains, NJ (US)

(72) Inventors: Robert Mallette, Mesa, AZ (US); Bradley Volkmann, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 654 days.

(21) Appl. No.: 16/244,336

(22) Filed: Jan. 10, 2019

(65) Prior Publication Data
US 2020/0223555 A1    Jul. 16, 2020

(51) Int. Cl.
| F02C 7/14 | (2006.01) |
| F02C 9/28 | (2006.01) |
| B64D 41/00 | (2006.01) |
| B64D 33/02 | (2006.01) |
| B64D 33/08 | (2006.01) |

(52) U.S. Cl.
CPC ............. *B64D 41/00* (2013.01); *B64D 33/02* (2013.01); *B64D 33/08* (2013.01); *F02C 7/14* (2013.01); *F02C 9/28* (2013.01); *B64D 2033/0213* (2013.01); *F05D 2220/50* (2013.01); *F05D 2260/20* (2013.01); *F05D 2270/303* (2013.01); *F05D 2270/304* (2013.01); *F05D 2270/3032* (2013.01)

(58) Field of Classification Search
CPC ...... F02C 9/28; F02C 7/12; F02C 7/14; F05D 2270/303; F05D 2270/3032; F05D 2270/3034; F05D 220/50; F01D 21/14
See application file for complete search history.

(56) References Cited

U.S. PATENT DOCUMENTS

| 7,716,971 | B2 | 5/2010 | Block et al. | |
| 2006/0254282 | A1* | 11/2006 | Riley | F02C 7/26 60/773 |
| 2013/0091850 | A1 | 4/2013 | Francisco | |
| 2013/0104561 | A1* | 5/2013 | Varillas | F01D 21/14 60/773 |
| 2016/0244179 | A1* | 8/2016 | Catt | G07C 5/008 |
| 2018/0058339 | A1* | 3/2018 | Snider | F02C 9/26 |

FOREIGN PATENT DOCUMENTS

EP     2554482 A2    2/2013

* cited by examiner

*Primary Examiner* — Gerald L Sung
*Assistant Examiner* — Rodolphe Andre Chabreyrie
(74) *Attorney, Agent, or Firm* — Lorenz & Kopf, LLP

(57) ABSTRACT

A system and method for adaptively controlling a cooldown cycle of an auxiliary power unit (APU) that is operating and rotating at a rotational speed includes reducing the rotational speed of the APU to a predetermined cooldown speed magnitude that ensures combustor inlet temperature has reached a predetermined temperature value, determining, based on one or more of operational parameters of the APU, when a lean blowout of the APU is either imminent or has occurred, and when a lean blowout is imminent or has occurred, varying one or more parameters associated with the shutdown/cooldown cycle.

9 Claims, 5 Drawing Sheets

AUXILIARY POWER UNIT ADAPTIVE COOLDOWN CYCLE SYSTEM AND METHOD

TECHNICAL FIELD

The present invention generally relates to auxiliary power units, and more particularly relates to an adaptive cooldown cycle system and method for auxiliary power units.

BACKGROUND

In many aircraft, main propulsion engines not only provide propulsion for the aircraft, but may also be used to drive various other rotating components such as, for example, generators, compressors, and pumps, to thereby supply electrical, pneumatic and/or hydraulic power. However, when an aircraft is on the ground, its main engines may not be operating. Moreover, in some instances the main propulsion engines may not be capable of supplying the power needed for propulsion as well as the power to drive these other rotating components. Thus, many aircraft include an auxiliary power unit (APU) to supplement the main propulsion engines in providing electrical, pneumatic, and/or hydraulic power. An APU may also be used to start the propulsion engines.

An APU is typically a gas turbine engine that includes a combustion section, a power turbine section, and a compressor section. During operation of the APU, the compressor section draws in and compresses ambient air and supplies the air to the combustion section and to various pneumatic loads. Fuel is injected into the compressed air within the combustion section to produce the high-energy combusted air to the power turbine section. The power turbine section rotates to drive a generator for supplying electrical power, via a main shaft, and to drive one or more compressors (e.g., a power compressor and a load compressor) in the compressor section.

When the APU is no longer needed, it is shutdown. During a normal APU shutdown, a cooldown cycle is performed. The cooldown cycle lowers combustor and atomizer skin temperatures to prevent coking that may be caused by wet fuel on hot metal. As is generally known, coking typically manifests itself in poor fuel atomization or combustion. In many cases, upon completing the cooldown cycle, various circuits and/or functions may be tested prior to, or as part of, the full shutdown of the APU.

The cooldown cycle is normally developed and validated on a new engine. The cooldown cycle performance is not monitored and remains the same throughout APU lifetime. However, as an APU ages it may, in some instances, experience a lean blowout before the cooldown cycle is complete. In such instances, the cooldown cycle cannot be relied upon to ensure coking is consistently being prevented. Moreover, the various circuits and/or functions would not get tested.

Hence, there is a need for a system and method to monitor the shutdown/cooldown cycle performance and adjust it, as necessary, to ensure the cycle reliably and consistently prevents coking as the APU ages and/or to ensure various circuits and/or functions are tested as part of the normal APU shutdown. The present invention addresses at least this problem.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an auxiliary power unit (APU) system includes an APU configured to rotate at a rotational speed, one or more sensors, and an APU control unit. The sensors are disposed within the APU, and each is configured to sense an operational parameter of the APU and supply a sensor signal representative of the operational parameter. The APU control unit is in operable communication with the APU and is coupled to receive the sensor signals from the one or more sensors. The APU control unit is further coupled to receive a shutdown signal and is operable, in response to the shutdown signal, to: (i) reduce the rotational speed of the APU to a predetermined cooldown speed magnitude that ensures combustor inlet temperature has reached a predetermined temperature value, (ii) determine, based on one or more of the sensor signals, when a lean blowout of the APU has occurred, and (iii) when a lean blowout has occurred, increasing the predetermined cooldown speed magnitude for use in a subsequent shutdown of the APU.

In another embodiment, a method of adaptively controlling a cooldown cycle of an auxiliary power unit (APU) that is operating and rotating at a rotational speed includes reducing the rotational speed of the APU to a predetermined cooldown speed magnitude that ensures combustor inlet temperature has reached a predetermined temperature value. A determination is made, based on one or more of operational parameters of the APU, when a lean blowout of the APU has occurred. When a lean blowout has occurred, the predetermined cooldown speed magnitude is increased for use in a subsequent shutdown of the APU.

In yet another embodiment, an auxiliary power unit (APU) system includes an APU configured to rotate at a rotational speed, one or more sensors, and an APU control unit. The one or more sensors are disposed within the APU, and each is configured to sense an operational parameter of the APU and supply a sensor signal representative of the operational parameter. The APU control unit is in operable communication with the APU and is coupled to receive the sensor signals from the one or more sensors. The APU control unit includes a plurality of overspeed trip circuits. Each overspeed trip circuit is coupled to receive a speed signal representative of the rotational speed of the APU and is configured to supply an overspeed trip signal when the speed signal indicates the rotational speed of the APU has exceeded a threshold speed to thereby cause fuel flow to the APU to cease. The APU control unit is further coupled to receive a shutdown signal and is operable, in response to the shutdown signal, to: (i) reduce the rotational speed of the APU at a predetermined rate for a predetermined time period to achieve a predetermined cooldown speed magnitude, (ii) supply a speed signal to one of the overspeed trip circuits that indicates the rotational speed of the APU has exceeded a threshold speed when the rotational speed of the APU is reduced to the predetermined cooldown speed magnitude, (iii) determine, based on one or more of the sensor signals, when a lean blowout of the APU has occurred, and (iv) when a lean blowout has occurred, increasing the predetermined cooldown speed magnitude for use in a subsequent shutdown of the APU. The APU control unit supplies the speed signal indicates the rotational speed of the APU has exceeded a threshold speed to a different one of the plurality of overspeed trip circuits each time it receives the shutdown signal.

In still another embodiment, a method of adaptively controlling a cooldown cycle of an auxiliary power unit (APU) that is operating and rotating at a rotational speed includes reducing the rotational speed of the APU to a predetermined cooldown speed magnitude that ensures combustor inlet temperature has reached a predetermined temperature value. A determination is made, based on one or more of operational parameters of the APU, as to whether a lean blowout of the APU is imminent. When a lean blowout is imminent, fuel flow is increased to prevent the lean blowout.

Furthermore, other desirable features and characteristics of the adaptive cooldown cycle system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
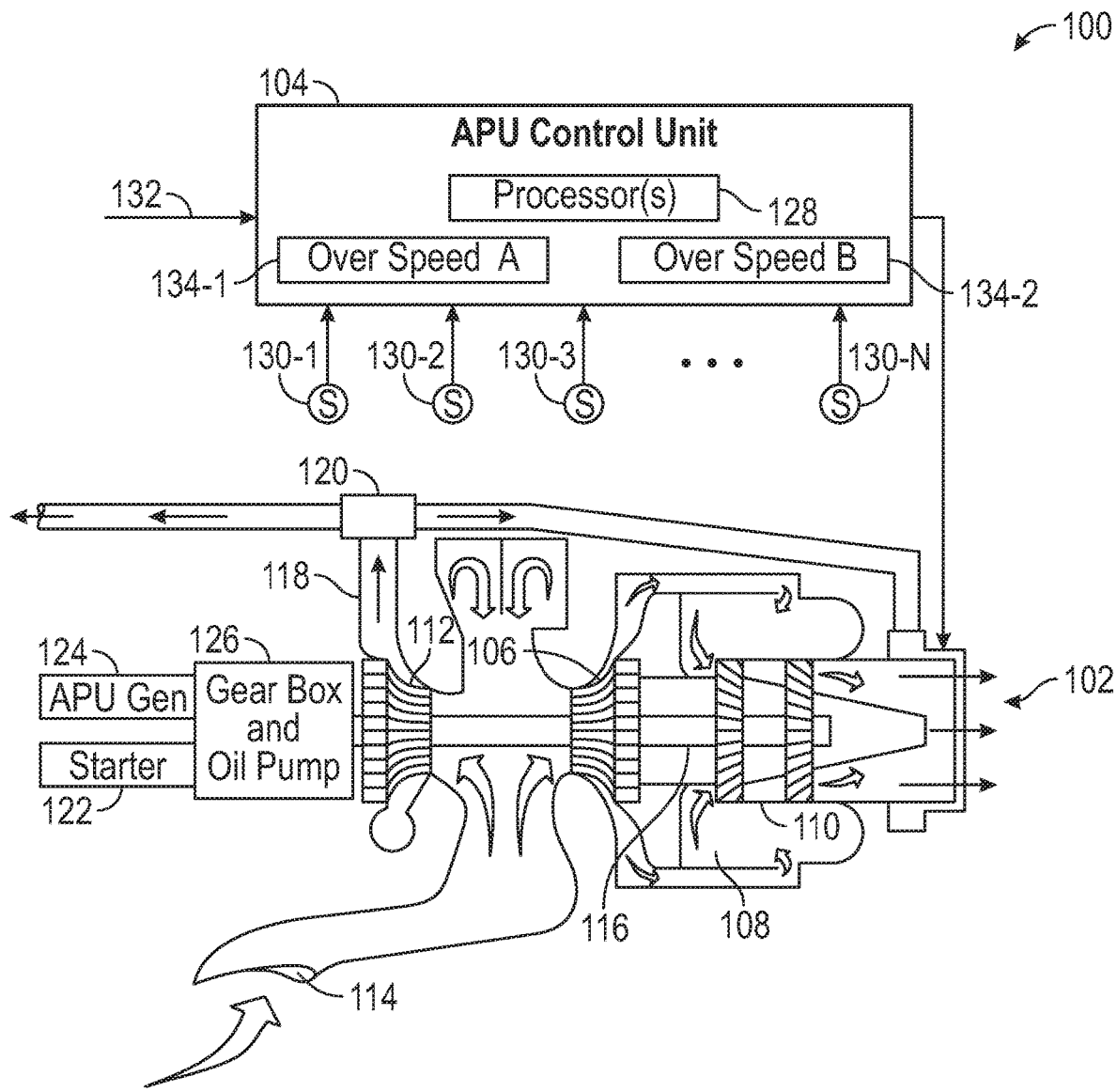
FIG. 1 depicts a schematic block diagram of one embodiment of an auxiliary power unit (APU) system.

Referring first to FIG. 1, one embodiment of an auxiliary power unit (APU) system 100 is depicted. The depicted APU system 100 includes an APU 102 and an APU control unit 104. A typical APU includes at least a compressor section, a combustion section, and a turbine section. The depicted APU 102 includes a power compressor 106, a combustor 108, a turbine 110, and a load compressor 112. During operation, the power compressor 106 draws ambient air into an inlet 114, compresses the air, and supplies the compressed air to the combustor 108. It will be appreciated that the power compressor 106 may be implemented using any one of numerous types of compressors. For example, the power compressor 106 may be a single-stage or multi-stage centrifugal and/or axial compressor system.

The combustor 108 receives the compressed air from the power compressor 106, and also receives a flow of fuel from a non-illustrated fuel source. The fuel and compressed air are mixed within the combustor 108, and the fuel-air mixture is ignited to produce relatively high-energy combustion gas. The combustor 108 may be implemented as any one of numerous types of combustors, including can-type combustors, reverse-flow combustors, through-flow combustors, and slinger combustors.

The relatively high-energy combustion gas that is generated in the combustor 108 is supplied to the turbine 110. As the high-energy combustion gas expands through the turbine 110, it impinges on the turbine blades, which causes the turbine 110 to rotate. It will be appreciated that the turbine 110 may be implemented using any one of numerous types of turbines. The turbine 110 includes a shaft 116 that drives the power compressor 106 and the load compressor 112.

The load compressor 112, when driven, draws ambient air into the inlet 114 and compresses the air. The compressed air may be supplied to various non-illustrated pneumatic loads. Thus, as FIG. 1 also depicts, a bleed air conduit 118 is coupled to receive compressed air from the load compressor 112 and supplies the compressed air, via a bleed valve 120, to the various pneumatic loads. As with the power compressor 106, the load compressor 112 may be implemented using any one of numerous types of compressors, including a single-stage or multi-stage centrifugal and/or axial compressor system.

The depicted APU 102 also includes a starter motor 122 and a generator 124, both of which are coupled to the shaft 116 via a gearbox and oil pump arrangement 126. The starter motor 122, when included, is used to rotate the shaft 116 when the APU 102 is being started. The generator 124, if included, may be used to generate and supply electrical power to various non-illustrated electrical loads. The gearbox and oil pump arrangement 126 help match the rotational speeds of the starter motor 122 and generator 124 to the APU 102, and also supplies oil to various rotating components in the APU 102.

The APU control unit 104 is in operable communication with the APU 102 and and is configured to control the APU 102. In particular, the APU control unit 104 includes one or more processors 128 that, in response to operator commands and feedback from one or more sensors 130 (e.g., 130-1, 130-2, 130-3 . . . 130-N), are configured to execute start-up, operational, and shutdown control logic. The start-up and operational control logic executed by the APU control unit 104 may be implemented using any one of numerous conventional start and operational control logics and will therefore not be further described. The shutdown control logic is executed by the APU control unit 104 upon receipt of a shutdown signal 132. The shutdown control logic that is executed by the APU control unit 104 is heretofore unknown and will thus be described in more detail.

Before describing the shutdown control logic, it is noted that the number and type of the one or more sensors 130 included in the APU 102 and that supply feedback to the APU control unit 104 may vary. In the depicted embodiment, the one or more sensors 130 may include one or more speed sensors, one or more temperature sensors, and/or one or more pressure sensors, just to name a few. Preferably, the one or more sensors 130 include at least a rotational speed sensor that is configured to sense the rotational speed of the APU and supply a sensor signal representative thereof. In some embodiments, the one or more sensors 130 may also include sensors that are used to directly sense, or indirectly derive, combustor inlet temperature, combustor internal temperature, atomizer skin temperature, various structure temperatures, ambient temperature, exhaust gas temperature, ambient pressure, and combustor inlet pressure, just to name a few non-limiting examples.

Figure 2:
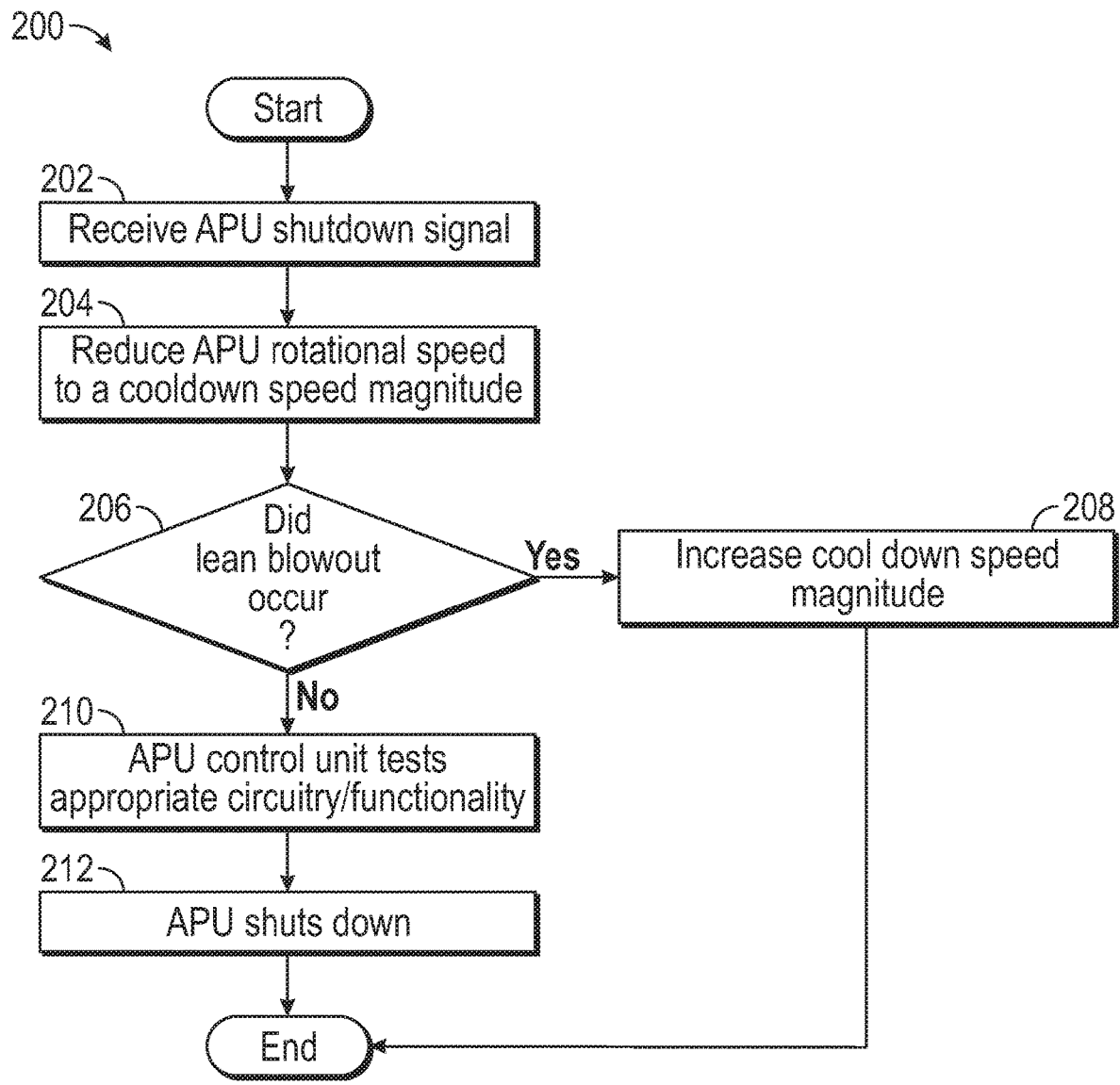
FIG. 2 depicts a flowchart of one embodiment of shutdown control logic that may be implemented in the APU control unit of FIG. 1 for controlling the APU during a shutdown/cooldown cycle.

Turning now to FIG. 2, the shutdown control logic 200 is initiated upon receipt, by the APU control unit 104, of the APU shutdown signal 132 (202). The APU shutdown signal 132 may be supplied automatically or manually. In the depicted embodiment, however, it is manually supplied in response to an operator (e.g., pilot) operating an appropriate user interface (e.g., switch, button, etc.). Regardless of the source of the shutdown signal 132, the shutdown control logic 200 then reduces the rotational speed of the APU 102 to a predetermined cooldown speed magnitude (204). It will be appreciated that the predetermined cooldown speed magnitude may vary from engine type-to-engine type, or even between engines of the same type. In all cases, however, the predetermined cooldown speed magnitude is preferably selected to be a speed that ensures at least that the inlet temperature of the combustor 108 has reached a predetermined temperature value to prevent coking.

It will additionally be appreciated that the APU control unit 104 may be configured to reduce the rotational speed of the APU 102 to the predetermined cooldown speed using any one of numerous techniques. For example, the APU control unit 104 may reduce the rotational speed of the APU 102 in one speed reduction stage or in multiple speed reduction stages. The APU 102 rotational speed may be reduced at a constant predetermined rate or a variable rate, or it may be reduced at a predetermined rate for a predetermined time period.

Figure 3:
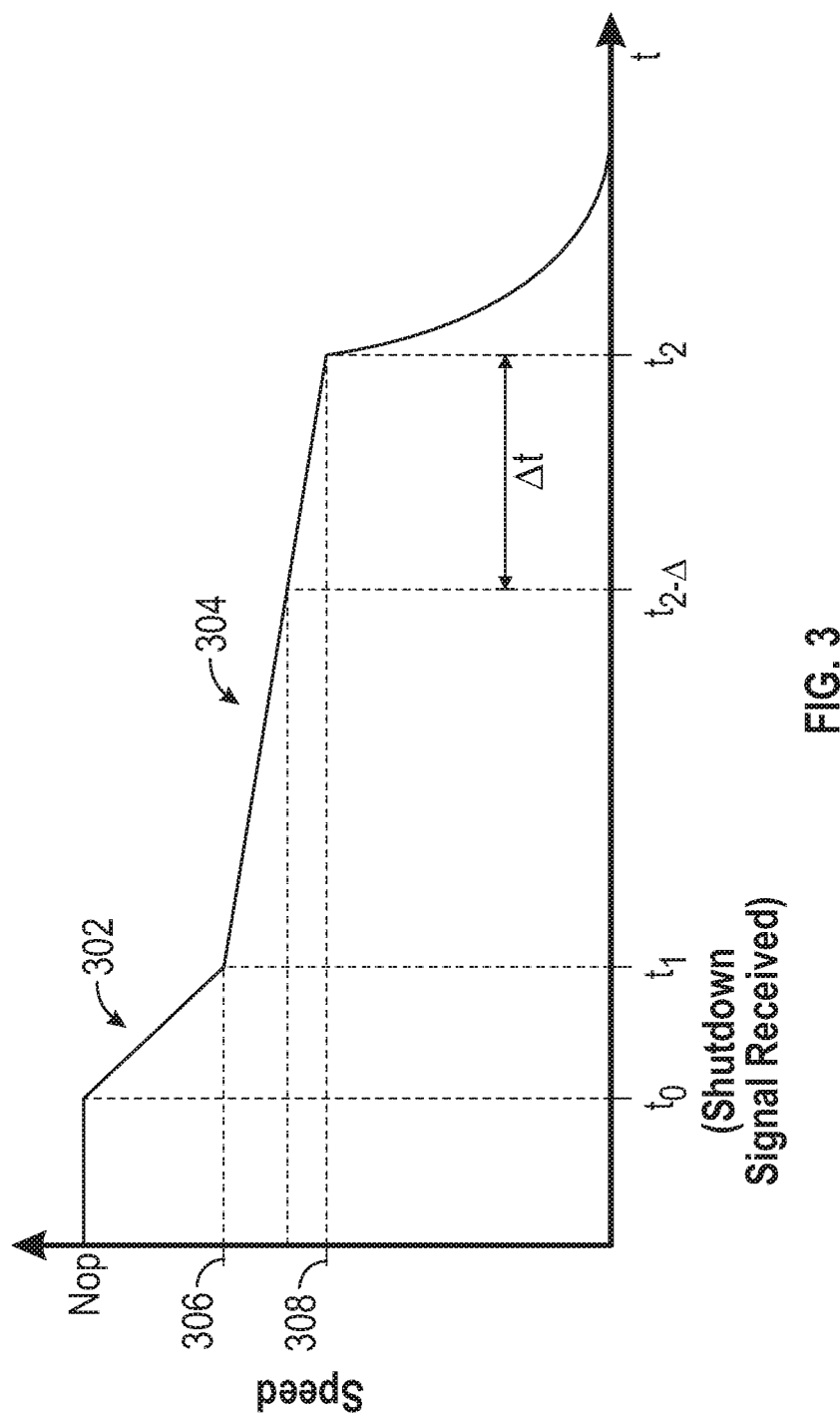
FIG. 3 graphically depicts one implementation of a shutdown/cooldown cycle of the APU of FIG. 1.

In one particular embodiment, which is depicted in FIG. 3, the APU control unit 104, upon receipt of the shutdown signal (at $t_0$), reduces the rotational speed of the APU 102 to the predetermined cooldown speed in two stages—a post-shutdown stage 302 and a cooldown stage 304. In the post-shutdown stage 302, the rotational speed of the APU 102 is reduced from its operational speed ($N_{OP}$) to a predetermined post-shutdown speed value 306 at a first speed reduction rate. Thereafter, in the cooldown stage 304, the rotational speed of the APU 102 is reduced to the predetermined cooldown speed value 308 at a second speed reduction rate. After the cooldown stage 304, fuel flow to the APU 102 is ceased and the APU 102 fully shuts down. As FIG. 3 clearly depicts, the first and second speed reduction rates are unequal. As will be described further below, in some embodiments one or both of the first and second speed reduction rates may be varied.

Returning now to FIG. 2, while the APU rotational speed is being reduced, the APU control unit 104 determines if a lean blowout of the APU has occurred (206). The APU control unit 104 may determine that a lean blowout has occurred using any one of numerous techniques. In the depicted embodiment, the APU control unit 104 makes this determination based on one or more of operational parameters of the APU 102. In one particular embodiment, the operational parameter is the rotational speed of the APU 102 since, as is generally known, the rotational speed will drop off relatively rapidly following a lean blowout. As such, the APU control unit 104 is configured to determine the rate of change of the rotational speed of the APU 104, and to determine that a lean blowout has occurred when the rate of change of the rotational speed of the APU 104 is greater than a predetermined rate magnitude. In some embodiments, the determination that a lean blowout has occurred could be made using sensors that are used to directly sense, or indirectly derive, change in combustor inlet temperature, change in combustor internal temperature, change in exhaust gas temperature, change in combustor pressure, just to name a few non-limiting examples.

Regardless of the specific technique used to determine if a lean blowout has occurred, when a determination is made that one has occurred, the shutdown control logic 200 increases the predetermined cooldown speed magnitude for use in subsequent shutdowns of the APU 102 (208), and the shutdown process ends. It will be appreciated that the technique used to increase the predetermined cooldown speed magnitude may vary. For example, the predetermined cooldown speed magnitude 308 may be increased by reducing the second speed reduction rate or, as depicted in FIG. 3, by reducing the time of the cooldown stage 304 by a predetermined amount of time ($\Delta t$) (e.g., from $t_2$ to $t_{2-\Delta}$), while keeping the second speed reduction rate the same.

As FIG. 2 further depicts, when a determination is made that a lean blowout has not occurred, the shutdown control logic 200 continues with the remainder of the normal shutdown process. Although this may vary, in the depicted embodiment this results in the APU control unit 104 testing appropriate circuitry and its functionality (210), and thereafter causing the APU 102 to be fully shutdown (212).

Again, while the circuitry and functionality may vary, in one particular embodiment, and with quick reference back to FIG. 1, the circuitry includes at least one overspeed trip circuit 134. As is generally known, an overspeed trip circuit 134 is coupled to receive a speed signal representative of the rotational speed of the APU 102 and is configured to supply an overspeed trip signal when the speed signal indicates the rotational speed of the APU 102 has exceeded a threshold speed. The overspeed trip signal in turn causes fuel flow to the APU to cease, and thus causes the APU to fully shutdown. In the depicted embodiment, the APU control unit 104 includes a plurality of overspeed trip circuits 134 (e.g., 134-1, 134-2) for redundancy purposes, and only one of the overspeed trip circuits 134 is tested during each non-lean-blowout APU shutdown process, in alternate fashion. As such, the APU control unit 104 is configured to supply a speed signal that indicates the rotational speed of the APU 102 has exceeded the threshold speed to a different one of the plurality of overspeed trip circuits 134 each time it receives the shutdown signal. It will be appreciated that in some embodiments, the APU control unit 104 may include only one overspeed trip circuit 134 or more than two overspeed trip circuits 134.

Figure 4:
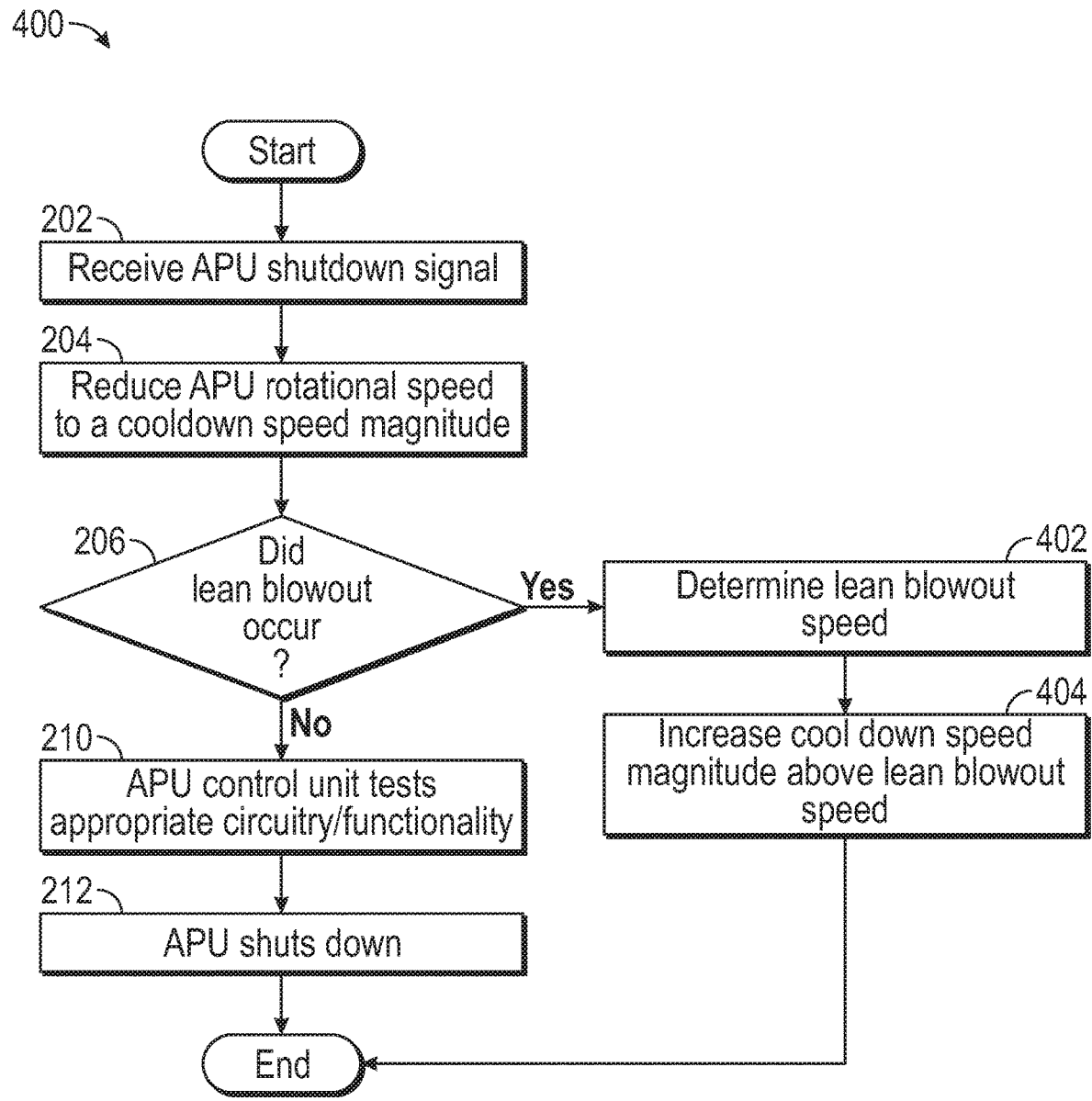
FIG. 4 depicts a flowchart of alternative shutdown control logic that may be implemented in the APU control unit of FIG. 1 for controlling the APU during a shutdown/cooldown cycle.

As was noted above, in the embodiment depicted in FIG. 2, and illustrated in FIG. 3, the APU control unit 104 is configured to increase the predetermined cooldown speed magnitude 308 by reducing the time of the cooldown stage 304 by a predetermined amount of time. This predetermined amount of time ($\Delta t$) may, however, be overly conservative. Thus, in some embodiments, as depicted in FIG. 4, the APU control unit 104 may execute an alternative shutdown control logic 400 that implements additional process steps in addition to those depicted in FIG. 2. Before describing these additional process steps, it is noted that like reference numerals in FIGS. 2 and 4 reference like process steps, and descriptions of these like process steps will not be repeated.

Turning now to the additional process steps of the alternative shutdown control logic 400, it is seen that when the APU control unit 104 determines that a lean blowout of the APU 102 has occurred, it determines what is referred to herein as a lean blowout speed (402). The lean blowout speed is the rotational speed of the APU 102 when the lean blowout occurred.

As FIG. 4 also depicts, the APU control unit 104 then increases the predetermined cooldown speed magnitude 308 to a speed magnitude that is greater than the determined lean blowout speed. The increased predetermined cooldown speed magnitude 308 is then used during the subsequent shutdown(s). This shutdown control logic 400 provides more accuracy in determining how much to increase the predetermined cooldown speed magnitude.

Figure 5:
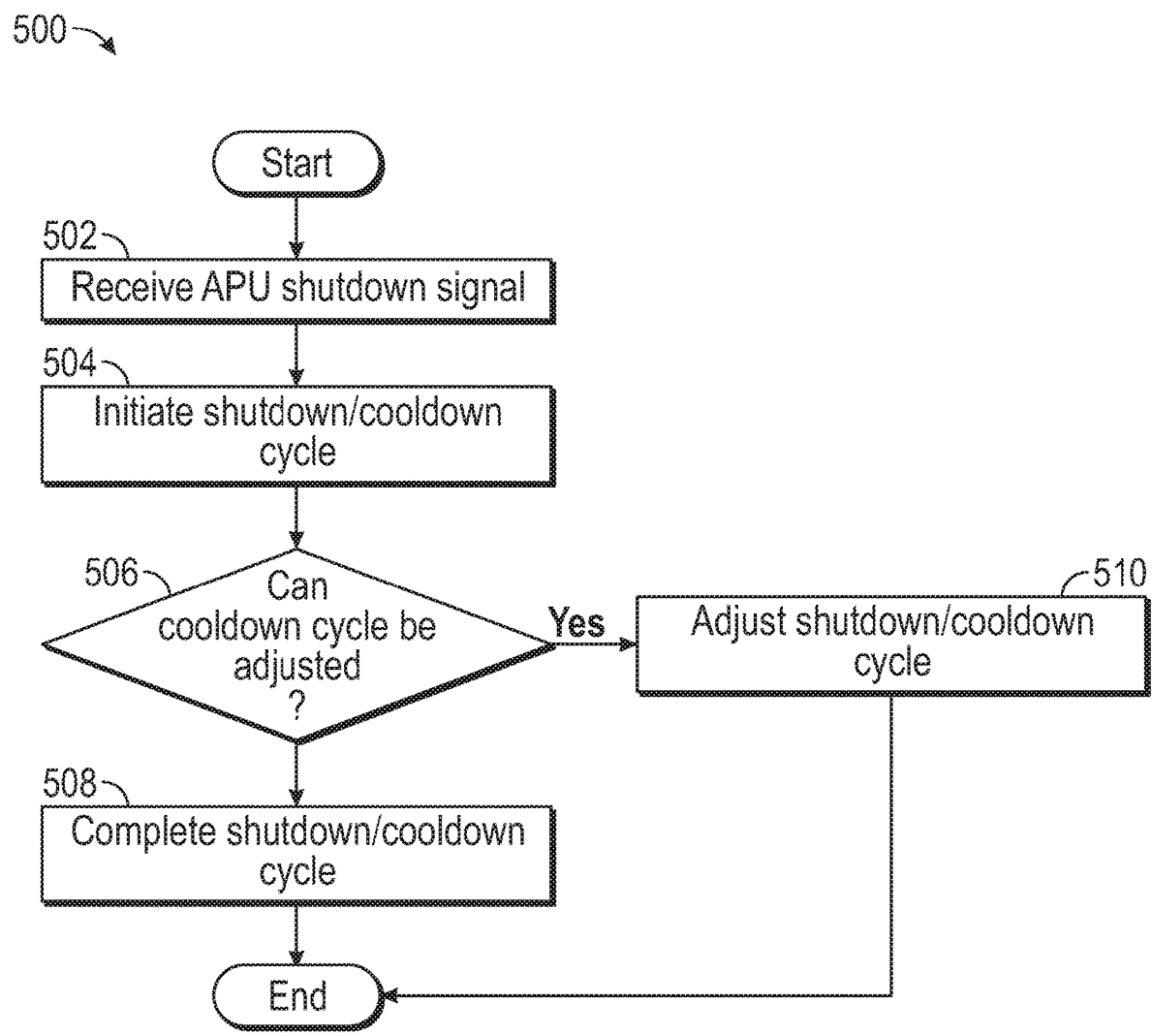
FIG. 5 depicts a flowchart of a process that may be implemented in the APU control unit of FIG. 1 for varying the shutdown/cooldown cycle.

It was additionally noted above, that in some embodiments one or both of the first and second speed reduction rates associated with the post-shutdown stage 302 and the cooldown stage 304, respectively, may be varied. The general process for implementing this functionality is depicted in FIG. 5 and will be momentarily described. It should be noted that this process 500 may be implemented in conjunction with or instead of the shutdown control logic 200, 400 depicted in FIGS. 2 and 4.

Turning now to the process 500, it too is initiated by the APU control unit 104 upon receiving the shutdown signal 132 (502). Thereafter, the normal shutdown/cooldown cycle is initiated (504) and a determination is made as to whether the shutdown/cooldown cycle can be (or needs to be) adjusted (506). If not, the normal shutdown/cooldown cycle is completed (508). If it is determined that the shutdown/cooldown cycle can be adjusted, then the cycle is adjusted (510). The shutdown/cooldown cycle can be adjusted by, for example, varying one or both of the first and second speed reduction rates.

The technique implemented in the APU control unit 104 to determine whether the shutdown/cooldown cycle can be adjusted may vary. In one embodiment, however, the APU control unit 104 uses operational parameters that are directly measured using one or more of the sensors 130, or that are derived from operational parameters measured by the one or more sensors 130. Some examples of the operational parameters include, but are not limited to, combustor temperature, atomizer skin temperature, various structure temperatures, ambient temperature, and exhaust gas temperature. One or more of these temperatures could be used during the shutdown/cooldown cycle to ensure the temperatures are sufficiently reduced to prevent coking, before fully shutting down the APU 102.

In some embodiments, these operational parameters could be used to adjust the speed or time at which the APU 102 operates in the post-shutdown stage 302 and/or the speed or time at which the APU 102 operates in the cooldown stage 304. This would minimize the amount of time needed to perform the shutdown/cooldown process.

In some other embodiments, APU control unit 104 may be configured, based on the operational parameters (directly sensed or derived), to determine that a lean blowout is imminent. In such embodiments, the shutdown/cooldown cycle may be adjusted by increasing fuel flow to the combustor 108 prevent the lean blowout, while still ensuring sufficient cooldown.

The technique implemented in the APU control unit 104 to determine an imminent lean blowout may also vary. In one embodiment, the APU control unit 104 may be configured to make this determination from the combustor loading characteristic. As is generally known, combustor loading is a function of ambient pressure, ambient temperature, combustor pressure, combustor temperature, fuel flow, and fuel temperature. As such, the APU control unit 104 may be configured to calculate the current combustor loading factor and compare it against a known combustor load map to determine if a lean blowout is imminent.

In another embodiment, the APU control unit 104 could monitor combustor pressure for oscillations or other anomalies that might be indicative of small blow outs with autoignite occurring. In yet another embodiment, the APU control unit 104 could be configured to monitor combustor pressure during every shutdown. The combustor pressure is then used to trend combustor health, specifically looking signs that is getting plugged with dirt, debris, corrosion, etc., and compare the trend to the known combustor loading curve or use a predetermined threshold to determine when to vary the shutdown/cooldown cycle.

Regardless of the technique used to determine an imminent blowout, in each embodiment, the APU control unit 104, in controlling the shutdown/cooldown cycle, gives priority to preventing lean blowout as opposed to achieving the lowest temperature to prevent coking.

The system and method described herein provide a means for monitoring the shutdown/cooldown cycle performance and adjusting it, as necessary, to ensure the cycle reliably and consistently prevents coking as the APU ages and/or to ensuring various circuits and/or functions are tested as part of the normal APU shutdown.

In one embodiment, an auxiliary power unit (APU) system includes an APU configured to rotate at a rotational speed, one or more sensors, and an APU control unit. The sensors are disposed within the APU, and each is configured to sense an operational parameter of the APU and supply a sensor signal representative of the operational parameter. The APU control unit is in operable communication with the APU and is coupled to receive the sensor signals from the one or more sensors. The APU control unit is further coupled to receive a shutdown signal and is operable, in response to the shutdown signal, to: (i) reduce the rotational speed of the APU to a predetermined cooldown speed magnitude that ensures combustor inlet temperature has reached a predetermined temperature value, (ii) determine, based on one or more of the sensor signals, when a lean blowout of the APU has occurred, and (iii) when a lean blowout has occurred, increasing the predetermined cooldown speed magnitude for use in a subsequent shutdown of the APU.

These aspects and other embodiments may include one or more of the following features. The APU control unit may also be configured, in response to the shutdown signal, to reduce the rotational speed of the APU at a predetermined rate. The APU control unit may also be configured, in response to the shutdown signal, to reduce the rotational speed of the APU at the predetermined rate for a predetermined time period. The APU control unit may also be configured, in response to the shutdown signal, to reduce the rotational speed of the APU to a predetermined post-shutdown speed value at a first speed reduction rate, and thereafter reduce the rotational speed of the APU to the predetermined cooldown speed value at a second speed reduction rate. The APU control unit may be further configured to selectively adjust one or both of the first and second speed reduction rates. The APU control unit may also include at least one overspeed trip circuit, the at least one overspeed trip circuit is coupled to receive a speed signal representative of the rotational speed of the APU and is configured to supply an overspeed trip signal when the speed signal indicates the rotational speed of the APU has exceeded a threshold speed. The APU control unit may be further configured to supply a speed signal that indicates the rotational speed of the APU has exceeded the threshold speed to the at least one overspeed trip circuit when the rotational speed of the APU is reduced to the predetermined cooldown speed magnitude, where the overspeed trip signal causes fuel flow to the APU to cease. The APU control unit may also include a plurality of overspeed trip circuits, and may be further configured to supply the speed signal that indicates the rotational speed of the APU has exceeded the threshold speed to a different one of the plurality of overspeed trip circuits each time it receives the shutdown signal. The APU control unit may be further configured to determine a rate of change of the rotational speed of the APU, and determine that the lean blowout of the APU has occurred when the rate of change of the rotational speed of the APU is greater than a predetermined rate magnitude. The APU control unit may be further configured, upon occurrence of the lean blowout of the APU, to determine a lean blowout speed, the lean blowout speed being the rotational speed of the APU when the lean blowout occurred, and increase the predetermined cooldown speed magnitude to greater than the lean blowout speed.

In another embodiment, a method of adaptively controlling a cooldown cycle of an auxiliary power unit (APU) that is operating and rotating at a rotational speed includes reducing the rotational speed of the APU to a predetermined cooldown speed magnitude that ensures combustor inlet temperature has reached a predetermined temperature value. A determination is made, based on one or more of operational parameters of the APU, when a lean blowout of the APU has occurred. When a lean blowout has occurred, the predetermined cooldown speed magnitude is increased for use in a subsequent shutdown of the APU.

These aspects and other embodiments may include one or more of the following features. Reducing the rotational speed of the APU by reducing the rotational speed at a predetermined rate. Reducing the rotational speed of the APU by reducing the rotational speed of the APU at the predetermined rate for a predetermined time period. Reducing the rotational speed of the APU to a predetermined post-shutdown speed value at a first speed reduction rate, and thereafter reducing the rotational speed of the APU to the predetermined cooldown speed value at a second speed reduction rate. The method may further include selectively adjusting one or both of the first and second speed reduction rates. When the rotational speed of the APU is reduced to the predetermined cooldown speed magnitude, at least one overspeed trip circuit may be caused cease fuel flow to the APU. A different one of a plurality of overspeed trip circuits may be caused to cease fuel flow to the APU each time the cooldown cycle of the APU is initiated.

In yet another embodiment, an auxiliary power unit (APU) system includes an APU configured to rotate at a rotational speed, one or more sensors, and an APU control unit. The one or more sensors are disposed within the APU, and each is configured to sense an operational parameter of the APU and supply a sensor signal representative of the operational parameter. The APU control unit is in operable communication with the APU and is coupled to receive the sensor signals from the one or more sensors. The APU control unit includes a plurality of overspeed trip circuits. Each overspeed trip circuit is coupled to receive a speed signal representative of the rotational speed of the APU and is configured to supply an overspeed trip signal when the speed signal indicates the rotational speed of the APU has exceeded a threshold speed to thereby cause fuel flow to the APU to cease. The APU control unit is further coupled to receive a shutdown signal and is operable, in response to the shutdown signal, to: (i) reduce the rotational speed of the APU at a predetermined rate for a predetermined time period to achieve a predetermined cooldown speed magnitude, (ii) supply a speed signal to one of the overspeed trip circuits that indicates the rotational speed of the APU has exceeded a threshold speed when the rotational speed of the APU is reduced to the predetermined cooldown speed magnitude, (iii) determine, based on one or more of the sensor signals, when a lean blowout of the APU has occurred, and (iv) when a lean blowout has occurred, increasing the predetermined cooldown speed magnitude for use in a subsequent shutdown of the APU. The APU control unit supplies the speed signal indicates the rotational speed of the APU has exceeded a threshold speed to a different one of the plurality of overspeed trip circuits each time it receives the shutdown signal.

These aspects and other embodiments may include one or more of the following features. The APU control unit may be configured, in response to the shutdown signal, to reduce the rotational speed of the APU to a predetermined post-shutdown speed value at a first speed reduction rate, and thereafter reduce the rotational speed of the APU to the predetermined cooldown speed value at a second speed reduction rate, wherein the first and second speed reduction rates are variable. The APU control unit may be further configured to determine a lean blowout speed, the lean blowout speed being the rotational speed of the APU when the lean blowout occurred, and increase the predetermined cooldown speed magnitude to greater than the lean blowout speed.

In still another embodiment, a method of adaptively controlling a cooldown cycle of an auxiliary power unit (APU) that is operating and rotating at a rotational speed includes reducing the rotational speed of the APU to a predetermined cooldown speed magnitude that ensures combustor inlet temperature has reached a predetermined temperature value. A determination is made, based on one or more of operational parameters of the APU, as to whether a lean blowout of the APU is imminent. When a lean blowout is imminent, fuel flow is increased to prevent the lean blowout.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An auxiliary power unit (APU) system, comprising: an APU configured to rotate at a rotational speed; one or more sensors disposed within the APU, each of the one or more sensors configured to sense an operational parameter of the APU and supply a sensor signal representative of the operational parameter; and an APU control unit in operable communication with the APU and coupled to receive the sensor signals from the one or more sensors, the APU control unit further coupled to receive a shutdown signal and configured, in response to the shutdown signal, to: (i) reduce the rotational speed of the APU to a predetermined cooldown speed magnitude that ensures combustor inlet temperature has reached a predetermined temperature value, (ii) determine, based on one or more of the sensor signals, when a lean blowout of the APU has occurred, and (iii) when a lean blowout has occurred, increasing the predetermined cooldown speed magnitude for use in a subsequent shutdown of the APU.

2. The APU system of claim 1, wherein the APU control unit is configured, in response to the shutdown signal, to reduce the rotational speed of the APU at a predetermined rate.

3. The AU system of claim 2, wherein the APU control unit is configured, in response to the shutdown signal, to reduce the rotational speed of the APU at the predetermined rate for a predetermined time period.

4. The APU system, of claim 1, wherein the APU control unit is configured, in response to the shutdown signal, to: reduce the rotational speed of the APU to a predetermined post-shutdown speed value at a first speed reduction rate, and thereafter reduce the rotational speed of the APU to the predetermined cooldown speed magnitude at a second speed reduction rate.

5. The APU system of claim 4, wherein the APU control unit is further configured to selectively adjust one or both of the first and second speed reduction rates.

6. The APU system of claim 1, wherein:
the APU control unit includes at least one overspeed trip circuit, the at least one overspeed trip circuit is coupled to receive a speed signal representative of the rotational speed of the APU and is configured to supply an overspeed trip signal when the speed signal indicates the rotational speed of the APU has exceeded a threshold speed;
the APU control unit is further configured to supply a speed signal that indicates the rotational speed of the APU has exceeded the threshold speed to the at least one overspeed trip circuit when the rotational speed of the APU is reduced to the predetermined cooldown speed magnitude; and
the overspeed trip signal causes fuel flow to the APU to cease.

7. The APU system of claim 6, wherein:
the APU control unit includes a plurality of overspeed trip circuits; and
the APU control unit is further configured to supply the speed signal that indicates the rotational speed of the APU has exceeded the threshold speed to a different one of the plurality of overspeed trip circuits each time it receives the shutdown signal.

8. The APU system of claim 1, wherein the APU control unit is further configured to:
determine a rate of change of the rotational speed of the APU; and
determine that the lean blowout of the APU has occurred when the rate of change of the rotational speed of the APU is greater than a predetermined rate magnitude.

9. The APU system of claim 1, wherein the APU control unit is further configured, upon occurrence of the lean blowout of the APU, to:
determine a lean blowout speed, the lean blowout speed being the rotational speed of the APU when the lean blowout occurred; and
increase the predetermined cooldown speed magnitude to greater than the lean blowout speed.

* * * * *